US012657043B2

(12) United States Patent
Dai

(10) Patent No.: US 12,657,043 B2
(45) Date of Patent: Jun. 16, 2026

(54) REMOTE ASSISTANCE METHOD, DEVICE, STORAGE MEDIUM, AND TERMINAL

(71) Applicant: GUANGDONG OPPO MOBILE TELECOMMUNICATIONS CORP., LTD., Dongguan (CN)

(72) Inventor: Runda Dai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 245 days.

(21) Appl. No.: 17/935,315

(22) Filed: Sep. 26, 2022

(65) Prior Publication Data

US 2023/0035047 A1 Feb. 2, 2023

Related U.S. Application Data

(63) Continuation of application No. PCT/CN2021/075730, filed on Feb. 7, 2021.

(30) Foreign Application Priority Data

Mar. 27, 2020 (CN) .......................... 202010229325.2

(51) Int. Cl.
G06F 3/0482 (2013.01)
G06F 3/0484 (2022.01)
(Continued)

(52) U.S. Cl.
CPC ............ G06F 9/453 (2018.02); G06F 3/0482 (2013.01); G06F 3/0484 (2013.01); H04M 1/72403 (2021.01)

(58) Field of Classification Search
CPC ...... G06F 9/453; G06F 3/0482; G06F 3/0484; G06F 9/452; H04M 1/72403; H04L 67/025; H04L 67/125
See application file for complete search history.

(56) References Cited

U.S. PATENT DOCUMENTS 10,445,051 B1 10/2019 Subash et al.
2010/0093319 A1 4/2010 Sherman
(Continued)

FOREIGN PATENT DOCUMENTS

CN 105763552 7/2016
CN 106254462 12/2016
(Continued)

OTHER PUBLICATIONS

Bomgar, "Representative Guide 13.1", Nov. 4, 2013, All pages. * (Year: 2013).*

(Continued)

*Primary Examiner* — Irete F Ehichioya
(74) *Attorney, Agent, or Firm* — Hodgson Russ LLP

(57) ABSTRACT

Disclosed in embodiments of the present application are a remote assistance method and apparatus, and a storage medium and a terminal. The method comprises: receiving a selection instruction on a target operating platform in a displayed terminal operating platform set, and displaying a function instruction operation corresponding to the target operating platform; obtaining operation information input for the function operation interface; and sending the operation information to an assisted terminal corresponding to the target operating platform, wherein the operation information is used for instructing an assisted used for the assisted terminal to operate on the displayed function operation interface on the basis of the operation information. By adopting the embodiments of the present application, remote assistance can be performed between different operating platforms, and the privacy of the assisted user can be prevented from being leaked.

12 Claims, 9 Drawing Sheets

(51) Int. Cl.
     *G06F 9/451*        (2018.01)
     *H04M 1/72403*      (2021.01)

(56)           References Cited

U.S. PATENT DOCUMENTS

| | | | |
|---|---|---|---|
| 2014/0118239 A1* | 5/2014 | Phillips | G06F 3/1454 |
| | | | 345/156 |
| 2014/0123180 A1* | 5/2014 | Xiao | H04N 21/64753 |
| | | | 725/37 |
| 2015/0033149 A1* | 1/2015 | Kuchoor | H04N 21/4782 |
| | | | 715/753 |
| 2015/0103131 A1* | 4/2015 | Denoue | H04N 7/15 |
| | | | 348/14.03 |
| 2015/0319178 A1 | 11/2015 | Desai et al. | |
| 2017/0264653 A1 | 9/2017 | Banyai et al. | |
| 2018/0234479 A1* | 8/2018 | Lilienthal | H04L 67/025 |
| 2019/0020554 A1* | 1/2019 | Lilienthal | H04L 41/22 |
| 2020/0220914 A1* | 7/2020 | Carrigan | G06F 3/04883 |

FOREIGN PATENT DOCUMENTS

| | | |
|---|---|---|
| CN | 103294523 | 3/2017 |
| CN | 107148012 A | 9/2017 |
| CN | 108920225 | 11/2018 |
| CN | 108984255 | 12/2018 |
| CN | 111459586 | 7/2020 |

OTHER PUBLICATIONS

EPO, Extended European Search Report for EP Application No. 21775318.5, Jul. 31, 2023.
CNIPA, Second Office Action for CN Application No. 202010229325.2, Aug. 28, 2023.
CNIPA, First Office Action for CN Application No. 202010229325.2, Dec. 15, 2022.
WIPO, International Search Report and Written Opinion for PCT/CN2021/075730, May 12, 2021.
EPO, Communication for EP Application No. 21775318.5, Apr. 9, 2026.

* cited by examiner

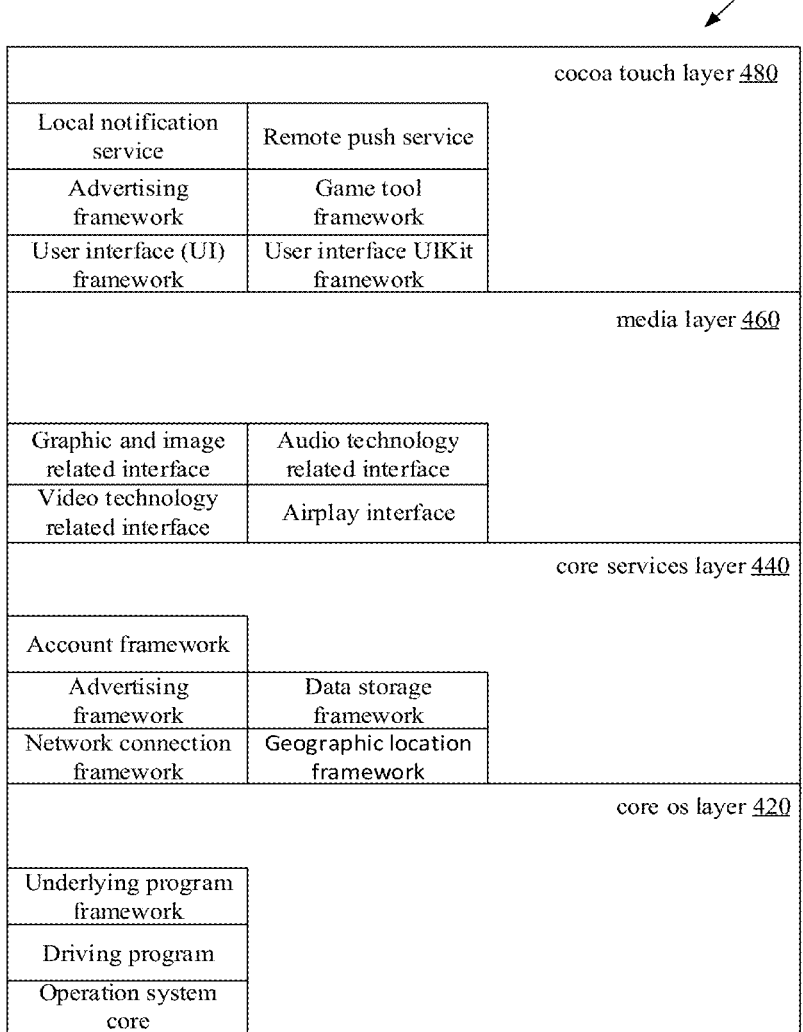

Memory 120

| cocoa touch layer 480 |
|---|

| Local notification service | Remote push service |
|---|---|
| Advertising framework | Game tool framework |
| User interface (UI) framework | User interface UIKit framework |

| media layer 460 |
|---|

| Graphic and image related interface | Audio technology related interface |
|---|---|
| Video technology related interface | Airplay interface |

| core services layer 440 |
|---|

| Account framework | |
|---|---|
| Advertising framework | Data storage framework |
| Network connection framework | Geographic location framework |

| core os layer 420 |
|---|

| Underlying program framework |
|---|
| Driving program |
| Operation system core |

FIG. 4

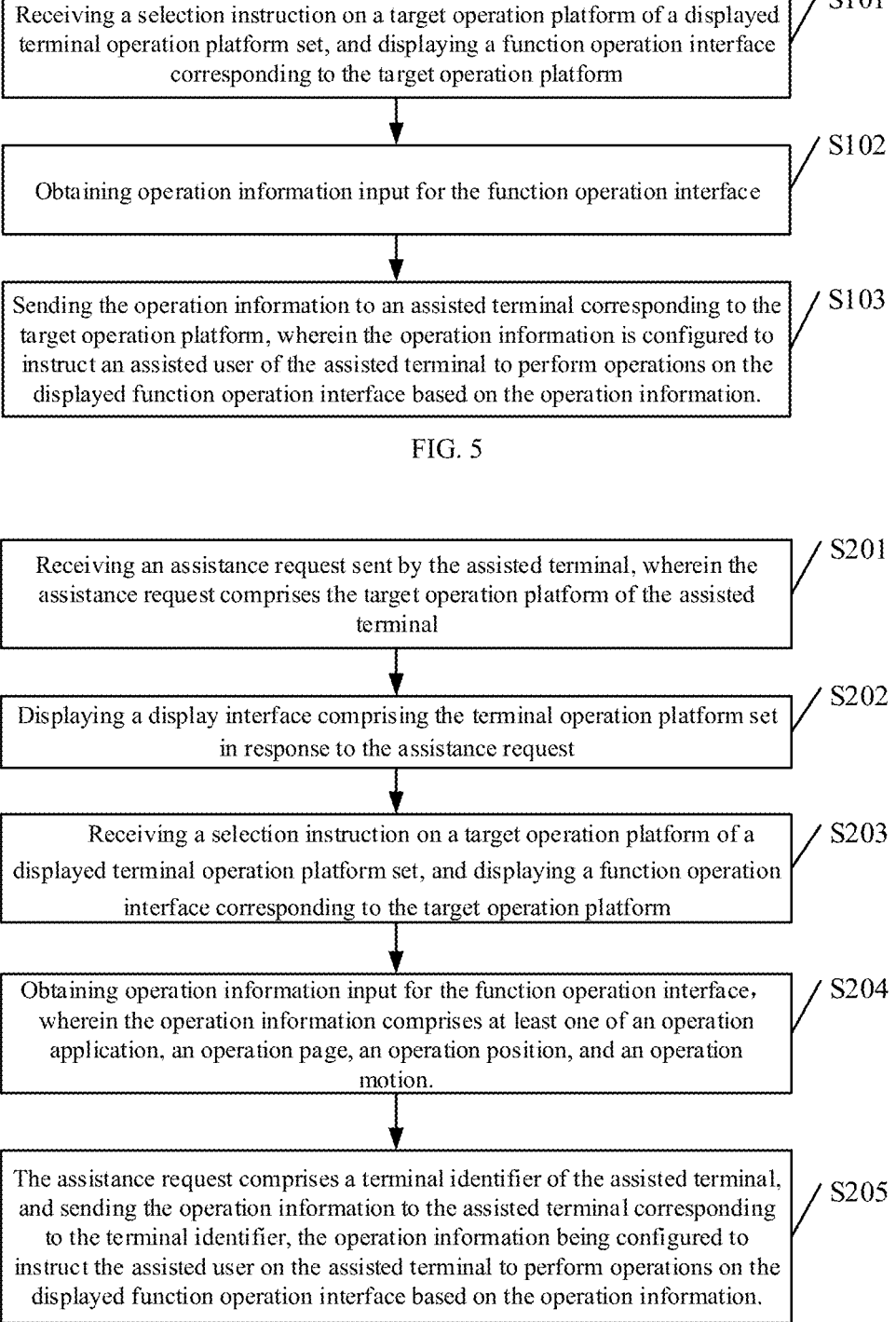

Receiving a selection instruction on a target operation platform of a displayed terminal operation platform set, and displaying a function operation interface corresponding to the target operation platform — S101

Obtaining operation information input for the function operation interface — S102

Sending the operation information to an assisted terminal corresponding to the target operation platform, wherein the operation information is configured to instruct an assisted user of the assisted terminal to perform operations on the displayed function operation interface based on the operation information. — S103

FIG. 5

Receiving an assistance request sent by the assisted terminal, wherein the assistance request comprises the target operation platform of the assisted terminal — S201

Displaying a display interface comprising the terminal operation platform set in response to the assistance request — S202

Receiving a selection instruction on a target operation platform of a displayed terminal operation platform set, and displaying a function operation interface corresponding to the target operation platform — S203

Obtaining operation information input for the function operation interface, wherein the operation information comprises at least one of an operation application, an operation page, an operation position, and an operation motion. — S204

The assistance request comprises a terminal identifier of the assisted terminal, and sending the operation information to the assisted terminal corresponding to the terminal identifier, the operation information being configured to instruct the assisted user on the assisted terminal to perform operations on the displayed function operation interface based on the operation information. — S205

FIG. 6

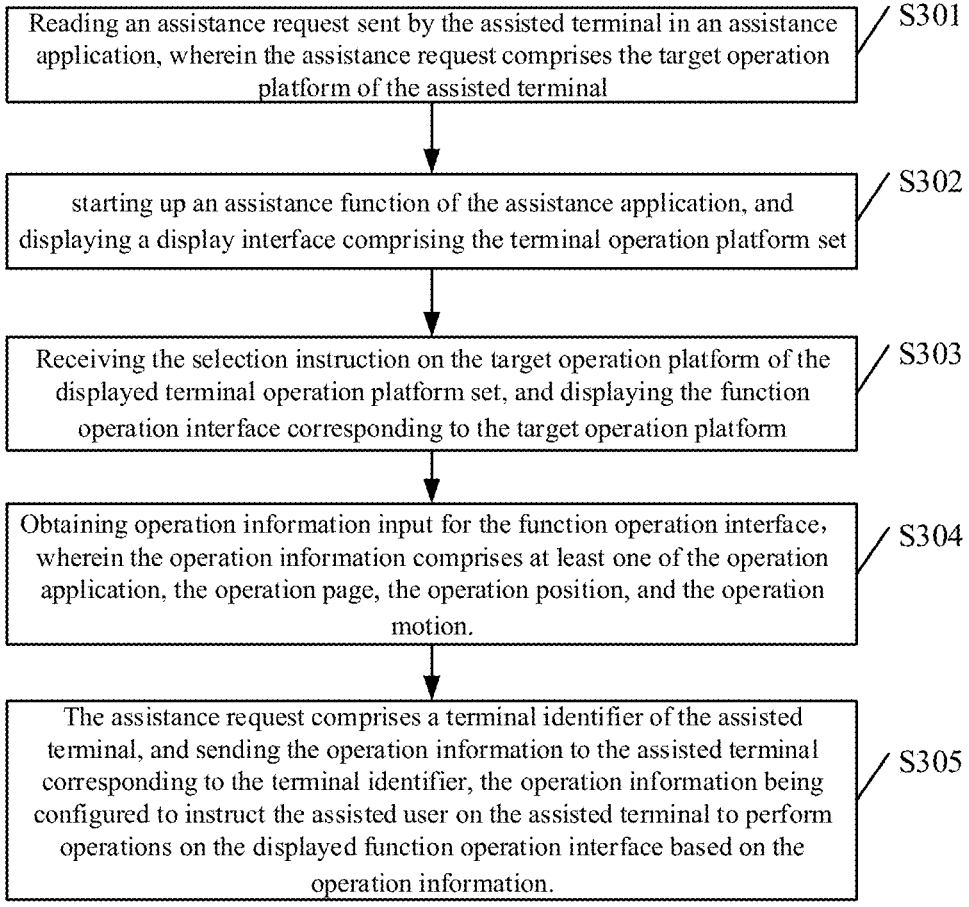

Reading an assistance request sent by the assisted terminal in an assistance application, wherein the assistance request comprises the target operation platform of the assisted terminal — S301 starting up an assistance function of the assistance application, and displaying a display interface comprising the terminal operation platform set — S302

Receiving the selection instruction on the target operation platform of the displayed terminal operation platform set, and displaying the function operation interface corresponding to the target operation platform — S303

Obtaining operation information input for the function operation interface, wherein the operation information comprises at least one of the operation application, the operation page, the operation position, and the operation motion. — S304

The assistance request comprises a terminal identifier of the assisted terminal, and sending the operation information to the assisted terminal corresponding to the terminal identifier, the operation information being configured to instruct the assisted user on the assisted terminal to perform operations on the displayed function operation interface based on the operation information. — S305

FIG. 9

REMOTE ASSISTANCE METHOD, DEVICE, STORAGE MEDIUM, AND TERMINAL

CROSS REFERENCE TO RELATED APPLICATIONS

The present application is a continuation of International Patent Application No. PCT/CN2021/075730, filed Feb. 7, 2021, which claims priority to Chinese Patent Application No. 202010229325.2, filed Mar. 27, 2020, the entire disclosures of which are incorporated herein by reference.

TECHNICAL FIELD

The present disclosure relates to the field of computers, and in particular to a remote assistance method, a non-transitory storage medium, and a terminal.

BACKGROUND

With the popularity of a smart apparatus, more and more people start to use the smart apparatus, including the elderly and others who have mild impairments in using or understanding the smartphone. In this case, it is necessary to be able to remotely assist the users with smart apparatus such as smartphones.

At present, the two apparatus may be on the same operation platform when realizing remote assistance between two smart apparatus (for example, both OPPO mobile phones). The remote assistance function may be implemented in virtue of a third-party application, but the remote assistance function may leak the privacy of the assisted users.

SUMMARY OF THE DISCLOSURE

In a first aspect, the embodiments of the present disclosure provide a remote assistance method. The method includes following operations.

A selection instruction on a target operation platform of a displayed terminal operation platform set may be received, and a function operation interface corresponding to the target operation platform may be displayed.

An operation information input for the function operation interface may be obtained.

An operation information may be sent to the assisted terminal corresponding to the target operation platform. The operation information may be configured to instruct the assisted user of the assisted terminal to perform operations on the displayed function operation interface based on the operation information.

In a second aspect, the embodiments of the present disclosure provide a computer-readable non-transitory storage medium. The non-transitory storage medium may store a plurality of instructions, and the processor is configured to load the instructions to perform the operations of the method of the above aspects.

In a third aspect, the embodiments of the present disclosure provide a terminal, including a processor and a non-transitory memory. The non-transitory memory may store computer programs, and the processor is configured to load the computer programs to perform the operations of the method of the above aspects.

BRIEF DESCRIPTION OF THE DRAWINGS

In order to more clearly illustrate technical solutions of embodiments of the present disclosure or technical solutions in the related art, accompanying drawings for the embodiments or the related art will be briefly described in the following. Obviously, the drawings in the following show only some of the embodiments of the present disclosure. Any ordinary skilled person in the art may obtain other drawings based on these drawings without any creative work.

FIG. 4 is a frame diagram of an IOS operation system shown in FIG. 1.

FIG. 5 is a flow chart of a remote assistance method according to an embodiment of the present disclosure.

FIG. 6 is a flow chart of a remote assistance method according to an embodiment of the present disclosure.

FIG. 9 is a flow chart of a remote assistance method according to an embodiment of the present disclosure.

SUMMARY OF THE DISCLOSURE

The technical solutions in the embodiments of the present disclosure will be clearly and completely described below in connection with the drawings in the embodiments of the present disclosure. Obviously, the described embodiments are only a part but not all of the embodiments of the present disclosure. All other embodiments obtained by those of ordinary skill in the art based on the embodiments in the present disclosure without making creative work shall fall within the scope of the present disclosure.

In the description of the present disclosure, it shall be the understood that, terms "first", "second", and the like are used herein for descriptive purposes only, and shall not be interpreted as indicating or implying relative importance. In the description of the present disclosure, to be noted that "including", "having" and any variation thereof are intended to cover non-exclusive inclusion unless otherwise expressly specified and defined. For example, a process, a method, a system, a product or an apparatus including a series of operations or units is not limited to the listed operations or units, but optionally also includes unlisted operations or units, or optionally also includes other operations or units inherent to the process, the method, the product or the apparatus. For those of ordinary skill in the art, specific meanings of the above terms in the present disclosure may be understood based on actual situations. Also, in the description of the present disclosure, "a plurality" means two or more unless otherwise specified. "And/or", which describes an association relationship of associated objects, means that there can be three kinds of relationships. For example, A and/or B may indicate that A exists alone, A and B exist at the same time, or B exists alone. The character "/" generally indicates that the associated objects are in an "or" relationship.

Figure 1:
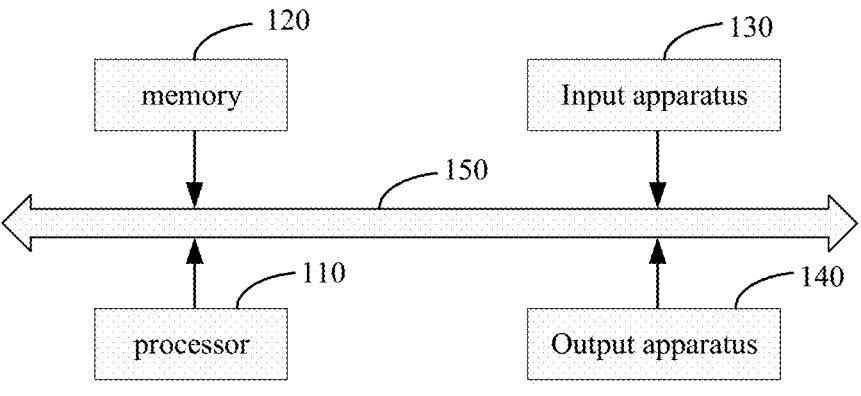
FIG. 1 is a schematic diagram of a terminal according to an embodiment of the present disclosure.

As shown in FIG. 1, FIG. 1 is a schematic diagram of a terminal according to an embodiment of the present disclosure. A terminal of the present disclosure may include one or more of the following: a processor 110, a non-transitory memory 120, an input apparatus 130, an output apparatus 140 and a bus line 150. The processor 110, the non-transitory memory 120, the input apparatus 130 and the output apparatus 140 may be connected through the bus line 150.

The processor 110 may include one or more processor cores. The processor 110 uses various interfaces and lines to connect various parts of the entire terminal, and executes various functions and processes data of the terminal 100 by running or executing an instruction, a program, a code set, an instruction set, or calling the data stored in the non-transitory memory 120. In some embodiments, the processor 110 may be accomplished in at least one hardware form of a digital signal processing (DSP), a field-programmable gate array (FPGA), or a programmable logic array (PLA). The processor 110 may integrate one or a combination of a central processing unit (CPU), a graphics processing unit (GPU), a modem, and the like. The CPU is mainly configured to operate a system, a user interface, and an application program; the GPU is configured to render and draw a content displayed on a display screen; the modem is configured to process wireless communication. It can be understood that, the modem may be implemented through a single chip without being integrated into the processor 110.

The non-transitory memory 120 may include a random access memory (RAM), or a read-only memory (ROM). The non-transitory memory 120 includes a non-transitory computer-readable storage medium. The non-transitory memory 120 may be configured to store an instruction, a program, a code, a code set, or an instruction set. The non-transitory memory 120 may include a program storage area and a date storage area, and the program storage area may store instructions used for implementing an operation system, instructions for achieving at least one function (such as a touch function, a sound playback function, an image playback function, and the like), instructions for implementing the following methods of various embodiments, and the like. The operation system may be an Android system, including a system of deep development based on Android system, or an IOS system developed by Apple, including a system or another system of deep development based on IOS system. The data storage area may store the data created by the terminal, such as a phonebook, video and audio data, chatting records, and the like.

Figure 2:
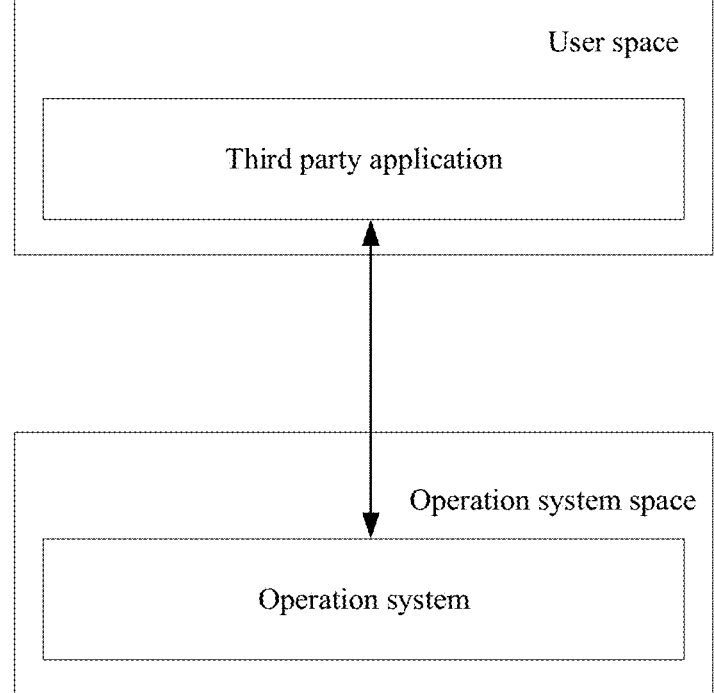
FIG. 2 is a schematic diagram of an operation system and a user space according to an embodiment of the present disclosure.

As shown in FIG. 2, the non-transitory memory 120 may include an operation system space and a user space. The operation system may be executed on the operation system space, and a native application and a third-party application may be executed on the user space. The operation system allocates a system resource for each of various third-party applications correspondingly to ensure each of the various third-party applications may be executed better. However, various application scenarios of a same third-party application may have different requirements for system resources. For example, when a local resource is loading, the third-part application requires a high speed of reading a disk reading. When animation is being rendered, the third-party application requires high performance for the GPU. The operation system and the third-party application may be independent of each other, and the operation system may not sense a present application scenario of the third-party application in time, such that the operation system may not perform system resource adaptation based on a specific application scenario of the third-party application.

In order to enable the operation system to distinguish specific application scenarios of the third-party application, data communication between the third-party application and the operation system needs to be performed with minimal relay. In this way, information of the present scenario of the third-party application may be obtained by the operation system at any time, and specific system resource adaptation may be performed based on the present scenario.

Figure 3:
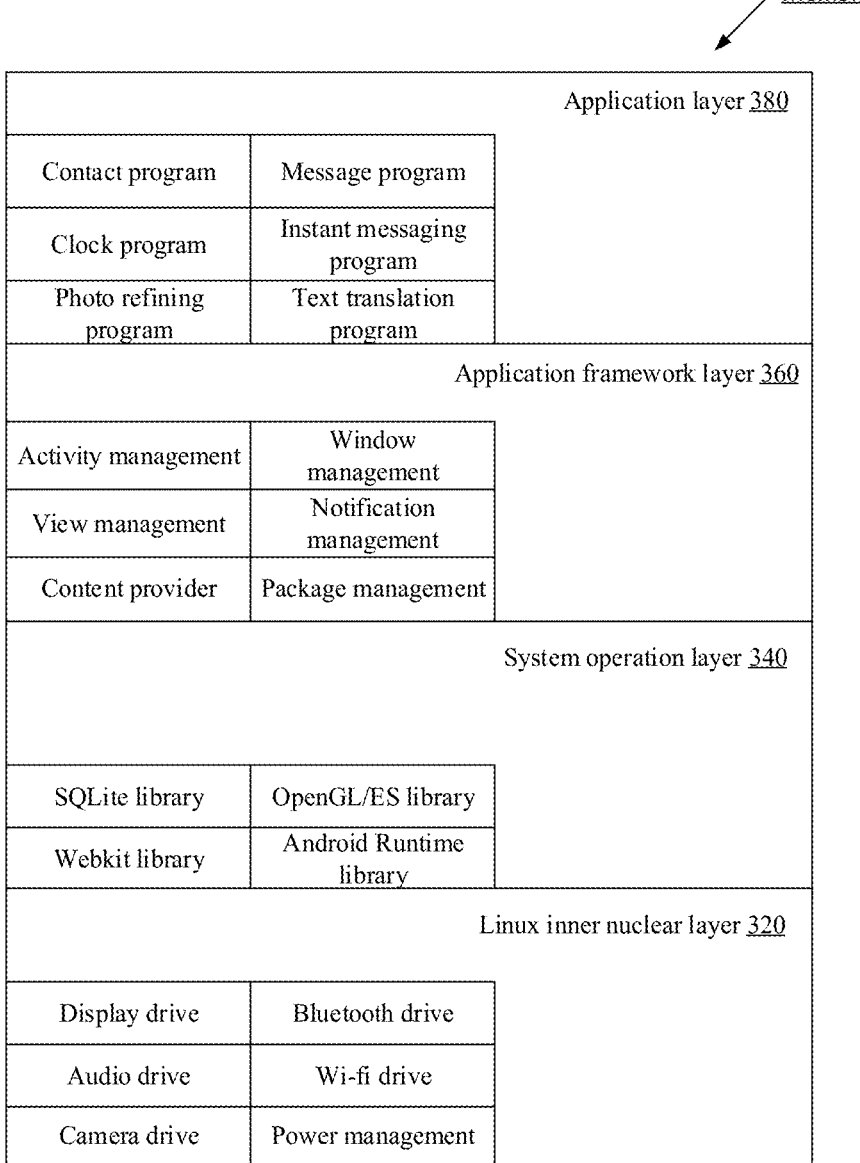
FIG. 3 is a frame diagram of an Android operation system shown in FIG. 1.

In an example of the Android system, a program and data stored in the non-transitory memory 120 is shown in FIG. 3. The non-transitory memory 120 may include a Linux inner kernel layer 320, a system runtime library layer 340, an application framework layer 360, an application layer 380. The Linux inner kernel layer 320, the system runtime library layer 340 and the application framework layer 360 belong to the operation system space, and the application layer 380 belongs to the user space. The Linux inner kernel layer 320 provides underlying drive for various hardware of the terminal, such as a display drive, an audio drive, a camera drive, a bluetooth drive, a wi-fi drive, and power management. The system runtime library layer 340 provides main feature support for the Android system by various C/C++ libraries. For example, a SQLite library provides support for a database, an OpenGL/ES library provides support for 3D drawing, and a Webkit library provides support for a browser core. The system runtime library layer may further provide an Android runtime library. The Android runtime library may provide some core libraries to allow a developer to write an Android application by using the Java language. The application framework layer 360 may provide various APIs for building applications, such that the developer may use the APIs for building their own applications, such as activity management, window management, view management, notification management, a content provider, package management, call management, resource management, and location management. At least one application may be executed in the application layer 380, and the application may be the native application that is configured in the operation system, such as a contact program, a message program, a clock program, a camera application, and the like. Alternatively, the application may be the third-party application developed by a third-party developer, such as a game application, an instant messaging program, a photo refining program, a text translation program, and the like.

In an example of the IOS system, the program and the data stored in the non-transitory memory 120 is shown in FIG. 4. The IOS system may include: a core OS layer 420, a core services layer 440, a media layer 460, and a cocoa touch layer 480. The core OS layer 420 may include an operation system core, a driving program, and a underlying program framework. The underlying program framework may provide function similar to hardware for a program framework located at the core services layer 440. The core services layer 440 may provide a system service/a system program framework for applications, such as a foundation framework, an account framework, an advertising framework, a data storage framework, a network connection framework, a geographic location framework, a motion framework, and the like. The media layer 460 may provide an audio-visual interface for applications, such as a graphic and image related interface, an audio technology related interface, a video technology related interface, and an airplay interface of audio and video transmission, and the like. The cocoa touch layer 480 may provide various common interface-related frameworks for program development, and facilitate the user to perform a touch interaction operation on the terminal. For example, the cocoa touch layer 480 may provide a local notification service, a remote push service, an advertising framework, a game tool framework, a user interface (UI) framework, a user interface UIKit framework, a map framework, and the like.

In the frameworks shown in FIG. 4, frameworks related to most applications may include but are not limited to the foundation framework of the core service layer 440 and the UIKit framework of the cocoa touch layer 480. The foundation framework may provide a plurality of basic object types and data types, providing the most basic system services for all applications, regardless of the UI. The UIKit framework may provide a basic UI class library, configured for creating a touch-based user interface. The IOS application may provide the UI based on the UIKit framework. Therefore, the UIKit framework may provide a basic framework for applications for building the user interface, for drawing and for processing interaction events with the user, for responding to gestures, and the like.

The method and principle of implementing data communication between a third-party application and an operation system in the IOS system may be referred to the Android system, which will not be repeatedly described herein.

An input apparatus 130 is configured to receive an input instruction or input data. The input apparatus includes but is not limited to a keyboard, a mouse, a camera, a microphone, a touch apparatus. An output apparatus 140 is configured to output the instructions or data. The output apparatus 140 includes but is not limited to a display apparatus, a loudspeaker, and the like. In an example, the input apparatus 130 and the output apparatus 140 may be combined, the input apparatus 130 and the output apparatus 140 may be a touch screen, and the touch screen is configured to receive a touch operation performed on or near the display by any suitable object, such as a finger, a touch pen, and the like. Further, the touch screen may display an user interface of each of various applications. The touch screen may usually be a front panel arranged on the terminal. The touch screen may be designed as a full screen, a curved screen or an irregular-shaped screen. Alternatively, the touch screen may be designed to be a combination of the full screen and the curved screen, or a combination of the irregular-shaped screen and the curved screen. the embodiments of the present disclosure do not limit the shape of the screen.

In addition, it shall be understood for one skilled in the art that a structure of the terminal shown in drawings shall not limit the terminal, and the terminal may include more or less components shown in the drawings, or combination of some components, or have various component arrangements. For example, the terminal may include a radio frequency circuit, an input unit, a sensor, an audio circuit, a wireless fidelity (WiFi) module, a power supply, a Bluetooth module, and the like, which will not be described herein.

According to the present embodiment, a subject of performing each operation may be the terminal described above. In some embodiments, the subject of performing each operation may be an operation system of the terminal. The operation system may be the Android system, the IOS system, or other operation systems, and will not be limited by present embodiment herein.

In the terminal of an embodiment of the present disclosure, a display apparatus may be arranged on the terminal. The display apparatus may be any apparatus that may achieve display function, such as a cathode ray tube display (CR), a light-emitting diode display (LED), an electronic ink screen, a liquid crystal display (LCD), a plasma display panel (PDP), and the like. The user may use the display apparatus on the terminal 101 to view a text, an image, a video, and the like. The terminal may be a smart phone, a tablet computer, a gaming apparatus, an augmented reality (AR) apparatus, a vehicle, a data storage apparatus, an audio playing apparatus, a video playing apparatus, a notebook, a desktop computing apparatus, a wearable apparatus such as an electronic watch, electronic glasses, an electronic helmet, an electronic bracelet, an electronic necklace, electronic clothing, and the like.

In the terminal shown in FIG. 1, the processor 110 may be configured to invoke an application stored in the non-transitory memory 120 to perform the remote assistance method according to an embodiment of the present disclosure.

In the embodiments of the present disclosure, the displayed function operation interface may be the operation interface corresponding to the operation platform of the assisted terminal, instead of the operation interface of the assisting terminal. Therefore, the remote assistance may be performed between different operation platforms. In addition, after the assisting user performs a series of operations, the assisting user may send the corresponding operation information to the assisted terminal. The assisted user may perform operations on his/her own, whereas the assisting user may not perform operations on the display interface of the assisted terminal, preventing the privacy of the assisted user from being divulged. To be noted that, in the present disclosure, the assisting terminal refers to a terminal that provides assistance to another terminal, and the assisted terminal refers to a terminal that needs to be assisted or receives the assistance.

In an embodiment, as shown in FIG. 5, a remote assistance method is provided. The method may be implemented by relying on a computer program and may be run on a remote assistance apparatus based on the Von Neumann system. The computer program may be integrated into an application or run as an independent application.

In detail, the remote assistance method may include following operations.

In an operation S101, a selection instruction on a target operation platform of a displayed terminal operation platform set may be received, and a function operation interface corresponding to the target operation platform may be displayed.

A terminal operation platform may be an operation system created by each of various terminal manufacturers, and terminal operation platforms may be divided based on the terminal manufacturers, such as the OPPO, the Huawei, the Apple, the Xiaomi, and the like.

The terminal operation platform set may be displayed on the display interface. The user may select the operation platform for the assisted terminal. The selected operation platform may be different from the operation platform of the instant local terminal. For example, the operation platform of the instant local terminal may be an OPPO operation platform, and the selected operation platform may be a Huawei operation platform.

The user may select the operation platform based on the operation platform of the assisted terminal according to their own understanding, or select the operation platform according to the operation platform carried in an assistance request sent by the assisted terminal, or select the operation platform based on the operation platform carried in the assistance request published in an assistance application. The present disclosure does not limit which assisted operation platform may be selected.

The function operation interface corresponding to the target operation platform may be displayed after the user selects the target operation platform. The function operation interface may be a system interface. The user may select a corresponding function or a corresponding application on the system interface according to their own requirements, such as selecting an alarm clock application on the system interface, and perform a setting operation on the alarm clock application. The function operation interface may be an operation interface of a certain system function or a certain application. Alternatively, the function operation interface may be a system function or an application selected before entering the display interface of the displayed terminal operation platform set. For example, the alarm clock application may be selected, and an alarm interface may be displayed after the operation platform is selected.

In an operation S102, operation information input for the function operation interface may be obtained.

It may be understood that the operation information may include an operation application, an operation page, an operation position, an operation action, and the like.

The operation application may specifically refer to an operation performed for a particular application, such as an operation performed for the alarm application, an operation performed for an instant messaging application, an operation performed for a setting application, and the like.

The operation page may be a certain level page in the operation application.

The operation position may be understood as a position where the user performs an operation on the operation page.

The operation action may be a type of operation performed by the user, such as a single-click operation, a double-click operation, and a screen swiping operation.

The terminal may record and store the operation information of the operation that the user performs on the operation interface. For example, a single-click operation may be performed on a setting button on a first-level page of an application A, and subsequently, a single-click operation may be performed on a "Next" button on the first-level page.

It should be noted that, the function operation interface may include a page of at least one level, such as a system page, a main page of the alarm application, a second-level page of the alarm application, and the like. An operation path may be formed according to a sequence of operations performed on the page of each level.

In an operation S103, the operation information may be sent to the assisted terminal corresponding to the target operation platform. The operation information may be configured to instruct the assisted user of the assisted terminal to perform operations on the displayed function operation interface based on the operation information.

The operation information being sent to the assisted terminal may be understood as follows. The operation information may be sent directly. Alternatively, the operation information may be sent in a form of a preset carrier. The preset carrier may be understood as a multimedia, such as a text, a picture, an audio, a video, and the like.

Of course, in order to facilitate the assisted terminal to understand the operation process more quickly, corresponding prompt information may be added to the sent multimedia, such as information of selecting time that the user needs, and information of operations completed, and the like. Alternatively, the corresponding prompt information may be added after the assisted terminal receives the operation information or the multimedia.

The assisted user may perform operations by following the sequence of operations as shown in the operation information after the assisted terminal receives the operation information. It may be understood that, the prompt information corresponding to the operation information may be displayed on the page synchronously with the operation information, while the assisted terminal is being operated. In this way, an assisting effect may be intuitive and effective.

In the embodiments of the present disclosure, the assisting terminal may receive the selection instruction on the target operation platform of the displayed terminal operation platform set, and display the function operation interface corresponding to the target operation platform. When the user performs a series of operations on the function operation interface, the assisting terminal may obtain and record the corresponding operation information, and send the operation information to the assisted terminal corresponding to the target operation platform. In this way, the assisted user of the assisted terminal may perform operations on the displayed function operation interface based on operation information. The displayed function operation interface may be the operation interface corresponding to the operation platform of the assisted terminal, instead of the operation interface of the assisting terminal. Therefore, the remote assistance may be performed between different operation platforms. In addition, the assisting user may send the corresponding operation information to the assisted terminal after performing a series of operations, and then the assisted user may perform operations by the his/herself, whereas the assisting user may not perform operations on the display interface of the assisted terminal, such that privacy of the assisted user may be prevented from being divulged. In addition, it is the operation information that is sent to the assisted terminal, and the operation information is configured to instruct the assisted user to perform operations, the assisted user may not need to worry about divulging their privacy, and may not determine the operation with others repeatedly. The user only needs to finish operations and click a next operation to complete the entire assisting process. Therefore, the assisting process may provide better guidance and learning effect to improve the user experience.

As shown in FIG. 6, FIG. 6 is a flow chart of a remote assistance method according to an embodiment of the present disclosure. More details will be described in the following.

In an operation 201, an assistance request sent by the assisted terminal may be received. The assistance request may include the target operation platform of the assisted terminal.

Figure 7:
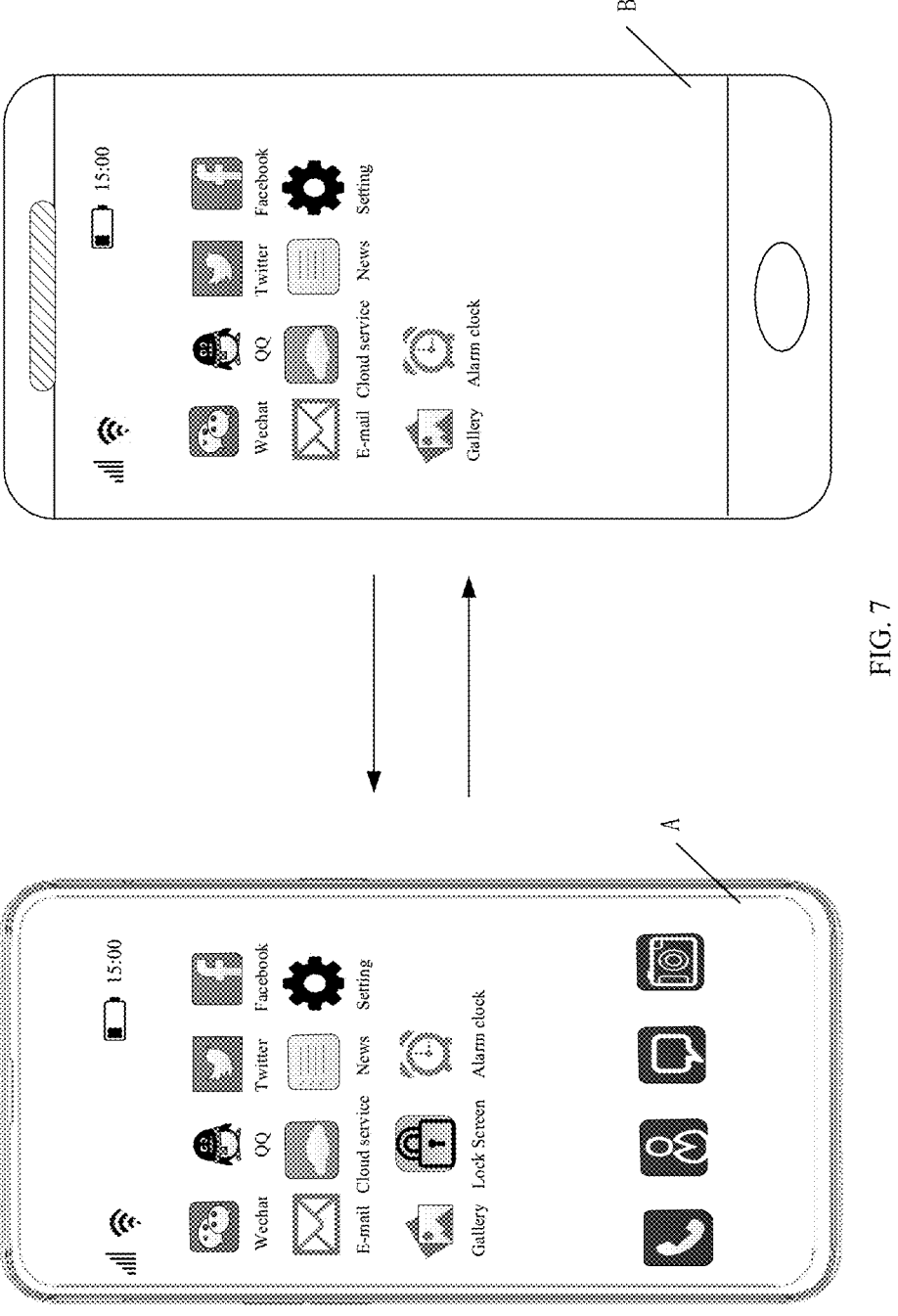
FIG. 7 is a frame diagram of a remote assistance scene according to an embodiment of the present disclosure.

As shown in FIG. 7, an assisted terminal B may be a Huawei mobile phone, and an assisting terminal A may be an OPPO mobile phone. The assisted terminal B may send the assistance request to the assisting terminal A through a message, a telephone, various instant messaging applications, or a remote assistance application, and the like.

The assistance request may include various information, such as an operation platform of the assisted terminal B, a model of the phone, an identifier of the phone, a matter that the assisted terminal requests the assistance for, and the like.

The terminal operation platform may be the operation system created by various terminal manufacturers, and the terminal operation platform may be classified according to terminal manufacturers, such as the OPPO, the Huawei, the Apple, the Xiaomi, and the like.

In an operation 202, in response to the assistance request, the display interface including the terminal operation platform set may be displayed;

It shall be understood that, the display interface including the terminal operation platform set may be triggered and initiated after the assisting terminal receives the request. Alternatively, after the assisting terminal receives the request, the corresponding request information may be displayed, so that the assisting user may observe the request information, activate the assistance function manually, and display the display interface including the terminal operation platform set.

Figure 8:
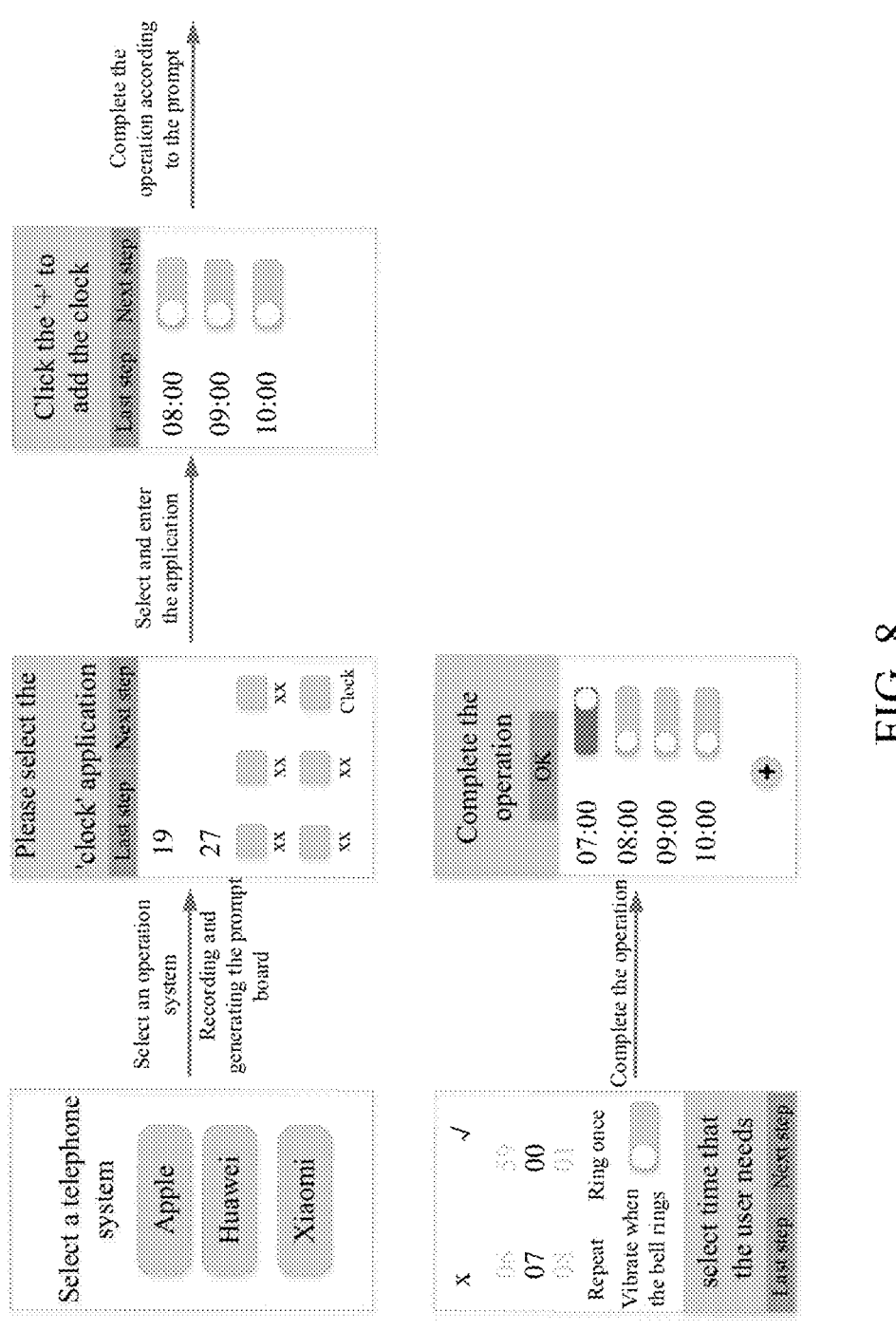
FIG. 8 is a schematic diagram showing an operation interface of remote assistance according to an embodiment of the present disclosure.

The display interface including terminal operation platform set may be an interface that displays at least one terminal operation platform for users to select, as shown in the first figure in FIG. 8.

In an operation S203, the selection instruction on the target operation platform of a displayed terminal operation platform set may be received, and the function operation interface corresponding to the target operation platform may be displayed.

The selection instruction may be input by the users, such as clicking on the target operation platform on the display interface; or may be input by terminal simulatively, such as simulatively clicking on the target operation platform on the display interface.

It shall be understood that, the various operation platforms may correspond to various function operation interfaces of a same function. For example, the operation interface of an alarm setting function for OPPO mobile phone may be different from the operation interface of an alarm setting function for Huawei mobile phone.

The function operation interface corresponding to the target operation platform may be displayed after the user selects the target operation platform. The function operation interface may be the system interface. The user may select the corresponding function or an application on the system interface according to their own requirements. For example, the user may select the alarm clock application on the system interface, and perform the operations to set the alarm clock. The function operation interface may be the operation interface of a certain system function or a certain application, or may be the system function or the application selected before entering the display interface of the display terminal operation platform set. For example, the alarm selection application may be selected, and the alarm interface may be displayed after the operation platform is selected.

In an operation S204, operation information input for the function operation interface may be received. The operation information may include at least one of the operation application, an operation page, an operation position, and an operation motion.

For example, the function operation interface may be the system interface. As shown in FIG. 8, the system operation interface as shown in a second figure of FIG. 8 may be entered after the target operation platform (such as Huawei) is selected. The interface may include various application icons, the user may select the corresponding application (such as a clock) to perform operations according to the assistance request of the assisted user. At this time, the operation information on the page may be recorded by the terminal, and a display page as shown in the third figure of FIG. 8 may be displayed. The user may click the control +, and the terminal may synchronously record the operation information on the page and display a page as shown in the fourth figure of FIG. 8. The above operations may be performed until the entire operation process is completed.

In an operation S205, the assistance request may include a terminal identifier of the assisted terminal. The operation information may be sent to the assisted terminal corresponding to the terminal identifier. The operation information is configured to instruct the assisted user of the assisted terminal to perform operations on the displayed function operation interface based on the operation information.

The assisting terminal may record the operation information and send the operation information to the assisted terminal in a same way as receiving the assistance request (as shown in FIG. 7). Alternatively, the assisting terminal may send the operation information to the assisted terminal according to a preset sending manner (such as sending by executing an application).

A multimedia file including the operation information may be generated, and the multimedia file may be sent to the assisted terminal corresponding to the target operation platform. The multimedia file is configured to instruct the assisted user of the assisted terminal to perform operations on the operation interface based on the multimedia file. The multimedia file may include a text, a picture, an audio, a video, and the like.

The multimedia file may include at least one prompt board, as shown in FIG. 8. In the second figure of FIG. 8, content of the prompt board may include "please select the 'clock' application", and in the third figure of FIG. 8, the content of the prompt board may include "click the '+' to add the clock". The operation information including the prompt board may be sent to the assisted terminal corresponding to the target operation platform according to an operation sequence of the at least one prompt board, and the assisted user may be instructed to perform operations by following the pictures in combination of the texts.

In the embodiments of the present disclosure, the displayed function operation interface may be the operation interface corresponding to the operation platform of the assisted terminal, instead of the operation interface of the assisting terminal. Therefore, the remote assistance may be performed between different operation platforms. In addition, the assisting user may perform a series of operations and send the corresponding operation information to the assisted terminal. Further, the assisted user may perform operations by the him/herself, whereas the display interface of the assisted terminal may not be operated by the assisting user, such that privacy of the assisted user may be prevented from being divulged. In addition, it is the operation information that is sent to the assisted terminal, and the operation information is configured to instruct the assisted user to perform operations, the assisted user may not need worry about their privacy being divulged, and may not determine the operation with others repeatedly. The user only need to finish operations and click a next operation to complete the entire assisting process. Therefore, the assisting process may provide a better guidance and learning effect to improve the user experience. In addition, the operation information may be sent to the assisted user in the form of prompt board, and the operation information may be intuitive and simple. Therefore, the assisting process may provide better guidance and learning effect to improve the user experience.

As shown in FIG. 9, FIG. 9 is a flow chart of a remote assistance method according to an embodiment of the present disclosure. More details will be described in the following.

In an operation S301, the assistance request sent by the assisted terminal in the assistance application may be read. The assistance request may include the target operation platform on the assisted terminal.

Figure 10:
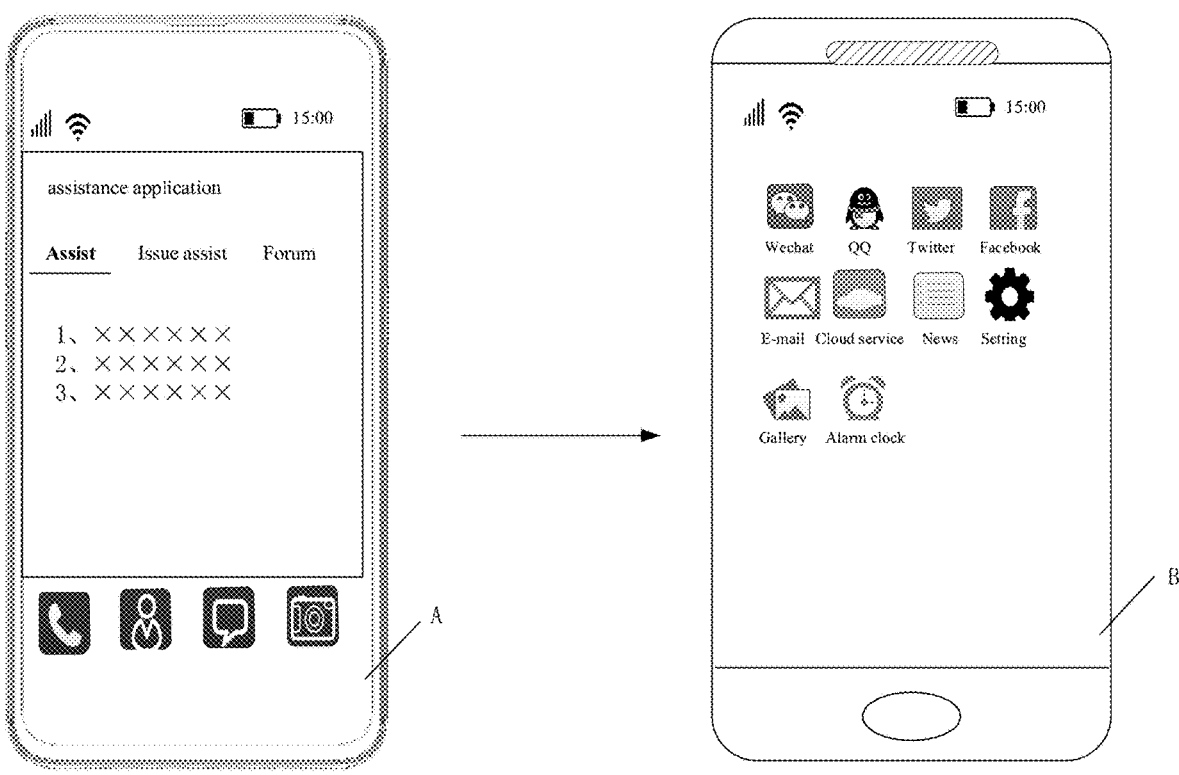
FIG. 10 is a frame diagram of a remote assistance scene according to an embodiment of the present disclosure.

It shall be understood that, the assistance application may be installed on the terminal. The display interface may display at least one assistance request sent by the assisted user when the assisting user activates the assistance application. As shown in FIG. 10, the assisting user may select one of the at least one assistance request, and the assisting terminal may read the content of the selected assistance request.

The assistance request may include a matter that the assisted terminal needs the assist for, the operation platform of the assisted terminal, the terminal identifier of the assisted terminal, a validity period of assistance, and the like.

The terminal operation platform may be the operation system created by each of various terminal manufacturers. Various terminal operation platforms may be classified according to terminal manufacturers, such as the OPPO, the Huawei, the Apple, the Xiaomi, and the like.

The assistance request may be a directed request or an undirected request. The directed request may refer to a request sent by the assisted user to a designated assisting terminal, and the undirected request may refer to a request sent by the assisted user on a public platform, where any user may provide assistance.

In an operation S302, an assistance function may be started on the assistance application, and the display interface including the terminal operation set may be displayed.

The assistance function in the assistance application may be started automatically after the assistance request is read, such that the user may be assisted, and the display interface including the terminal operation platform set may be displayed synchronously.

In the terminal operation platform set, various operation platforms may be arranged from a highest frequency of user's assistance in the past to a lowest frequency of user's assistance in the past. In some embodiments, in the terminal operation platform set, various operation platforms may be arranged from the largest number of operation platforms available in the market to the lowest number of operation platforms available in the market. In this way, the user may find the target operation platform rapidly.

In an operation S303, the selection instruction on the target operation platform of the displayed terminal operation platform set may be received, and the function operation interface corresponding to the target operation platform may be displayed.

In an operation S304, operation information input for the function operation interface may be received.

Details of the operation S303 to S304 may refer to the operations of S203 to S204, and will not be repeatedly described herein.

In an operation S305, the assistance request may include the terminal identifier of the assisted terminal. The operation information may be sent to the assisted terminal corresponding to the terminal identifier. The operation information is configured to instruct the assisted user of the assisted terminal to perform operations on the displayed function operation interface based on the operation information.

The assisting terminal may send the operation information to the assisted terminal through the message, the instant messaging application, or the assistance application, and the like, after assisting terminal record the operation information, as shown in FIG. 10.

The multimedia file including the operation information may be generated, and the multimedia file may be sent to the assisted terminal corresponding to the target operation platform. The multimedia file is configured to instruct the assisted user of the assisted terminal to perform operations on the operation interface based on the multimedia file. The multimedia file may include the text, the picture, the audio, the video, and the like.

The multimedia file may include at least one prompt board, as shown in FIG. 8. In the second figure of FIG. 8, content of the prompt board may include "please select the 'clock' application", and in the third figure of FIG. 8, the content of the prompt board may include "click the '+' button to add the clock". The operation information including the prompt board may be sent to the assisted terminal corresponding to the target operation platform according to the operation sequence of the at least one prompt board, and the assisted user may be instructed to perform operations by following the pictures in combination of the texts.

In the embodiments of the present disclosure, the assistance application is configured as an assistance entrance, the user may be assisted to view the assistance information by logging in to the application, which is easy to implement in the program. The displayed function operation interface may be the operation interface corresponding to the operation platform of the assisted terminal, instead of the operation interface of the assisting terminal. Therefore, the remote assistance may be performed between different operation platforms. In addition, the assisting user may perform a series of operations and send the corresponding operation information to the assisted terminal. Further, the assisted user may perform operations by the him/herself, whereas the display interface of the assisted terminal may not be operated by the assisting user, such that privacy of the assisted user may be prevented from being divulged. In addition, it is the operation information that is sent to the assisted terminal, and the operation information is configured to instruct the assisted user to perform operations, the assisted user may not need worry about their privacy being divulged. Teaching one to fish is better than giving him fish, the assisted user may also learn how to perform the operations in each assistance process. In addition, the operation information may be sent to the assisted user in the form of prompt board, and the operation information may be intuitive and simple. The assisted user may watch the prompt board and learn the operations easily, and the user experience may be improved.

Embodiments of the present disclosure further provide an apparatus, configured to perform the method in the embodiments of the present disclosure. Details that are not disclosed in the apparatus in the embodiments of the present disclosure may be referred to the method in the embodiments of the present disclosure.

Figure 11:
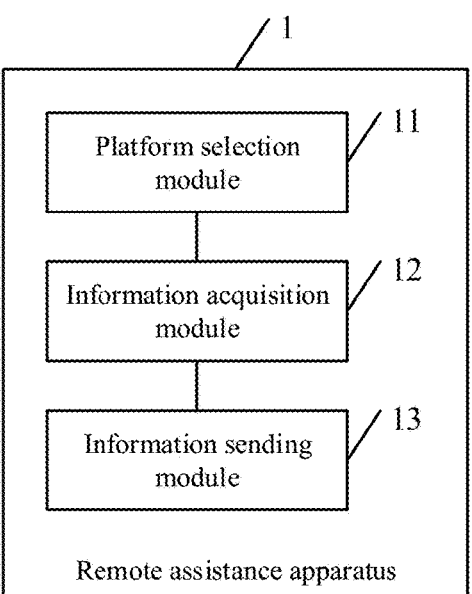
FIG. 11 is a schematic diagram of an apparatus of remote assistance according to an embodiment of the present disclosure.

As shown in FIG. 11, FIG. 11 is a schematic diagram of an apparatus of remote assistance according to an embodiment of the present disclosure. The apparatus of remote assistance may be implemented in a form of software, hardware, or a combination thereof, to be all or a part of a terminal. The apparatus 1 may include a platform selection module 11, an information acquisition module 12 and an information sending module 13

The platform selection module 11 may be configured to receive the selection instruction on the target operation platform of the displayed terminal operation platform set, and display the function operation interface corresponding to the target operation platform.

The information acquisition module 12 may be configured to obtain operation information input for the function operation interface.

The information sending module 13 may be configured to send the operation information to the assisted terminal corresponding to the target operation platform. The operation information may be configured to indicate the assisted user of the assisted terminal to perform operations on the displayed function operation interface based on the operation information.

The operation information may include at least one of the operation application, the operation page, the operation position, and the operation motion.

Figure 12:
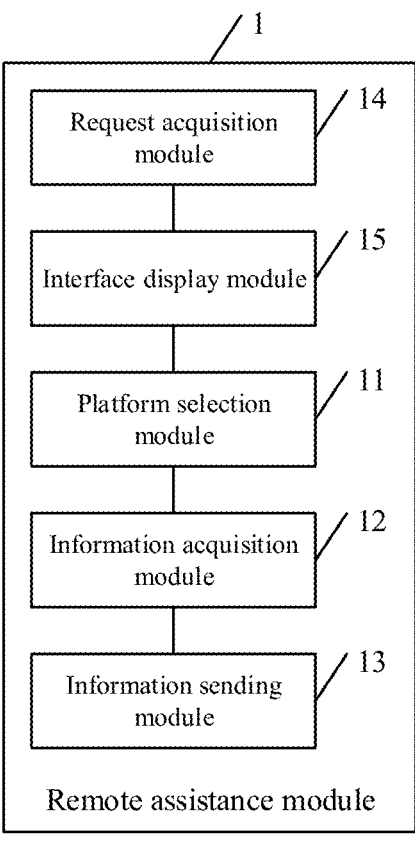
FIG. 12 is a schematic diagram of an apparatus of remote assistance according to an embodiment of the present disclosure.

As shown in FIG. 12, the apparatus may further include following components.

A request acquisition module 14 may be configured to receive the assistance request sent by the assisted terminal. The assistance request may include the target operation platform of the assisted terminal.

An interface display module 15 may be configured to display the display interface including the terminal operation platform set in response to the assistance request.

The platform selection module 11 may be specifically configured to perform following operations.

The platform selection module 11 may be configured to receive the selection instruction on the target operation platform of the displayed terminal operation platform set.

Figure 13:
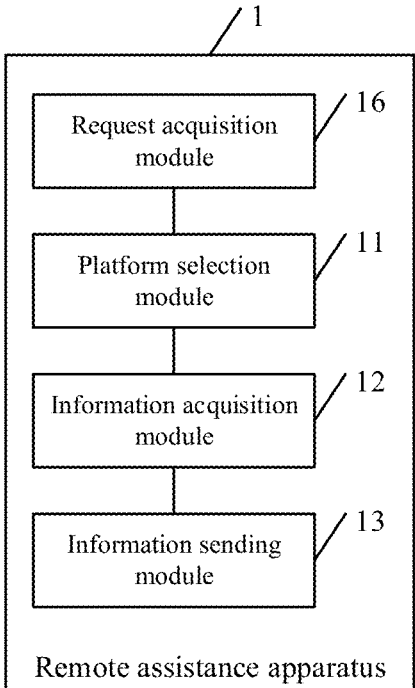
FIG. 13 is a schematic diagram of an apparatus of remote assistance according to an embodiment of the present disclosure.

As shown in FIG. 13, the apparatus may further include following components.

A request reading module 16 may be configured to read the assistance request sent by the assisted terminal from the assistance application. The assistance request may include the target operation platform of the assisted terminal.

The platform selection module 11 may be specifically configured to perform following operations.

The platform selection module 11 may be configured to start the assistance function of the assistance application, and display the display interface including the terminal operation platform set.

The platform selection module 11 may be configured to receive the selection instruction on the target operation platform of the displayed terminal operation platform set.

The assistance request may include the terminal identifier of the assisted terminal. The information sending module 13 may be specifically configured to perform following operations.

The information sending module 13 may be configured to send the operation information to the assisted terminal corresponding to the terminal identifier.

The information sending module 13 may be specifically configured to perform following operations.

The information sending module 13 may be configured to generate the multimedia file including the operation information, and send the multimedia file to the assisted terminal corresponding to the target operation platform. The multimedia file is configured to instruct the assisted user of the assisted terminal to perform operations on the operation interface based on the multimedia file.

The multimedia file may include at least one prompt board. The information sending module 13 may be specifically configured to perform following operations.

The information sending module 13 may be configured to send the at least one prompt board to the assisted terminal corresponding to the target operation platform successively according to the operation sequence of the at least one prompt board.

It should be noted that, when the apparatus of remote assistance provided by the above embodiment executes the remote assistance method, the apparatus is illustrated based on the above functional modules as an example. Practically, the above functions may be assigned to different functional modules as needed. That is, an internal structure of the apparatus may be divided into different functional modules to perform all or some of the above described functions. In addition, the apparatus of remote assistance and the remote assistance method provided by the above embodiments belong to a same concept. Detailed implementation processes of the apparatus may be referred to the method embodiments, which will not be repeated herein.

The above reference numerals of the embodiments of the present disclosure are used only for description, and do not represent advantages or disadvantages of the embodiments.

In the embodiments of the present disclosure, the assisting terminal may receive the selection instruction on the target operation platform of the displayed terminal operation platform set, and display the function operation interface corresponding to the target operation platform. When the user performs a series of operations on the function operation interface, the assisting terminal may obtain and record the corresponding operation information, and send the operation information to the assisted terminal corresponding to the target operation platform. In this way, the assisted user of the assisted terminal may perform operations on the displayed function operation interface based on operation information. The displayed function operation interface may be the operation interface corresponding to the operation platform of the assisted terminal, instead of the operation interface of the assisting terminal. Therefore, the remote assistance may be performed between different operation platforms. In addition, the assisting user may send the corresponding operation information to the assisted terminal after performing a series of operations, and then the assisted user may perform operations by the his/herself, whereas the assisting user may not perform operations on the display interface of the assisted terminal, such that privacy of the assisted user may be prevented from being divulged. In addition, it is the operation information that is sent to the assisted terminal, and the operation information is configured to instruct the assisted user to perform operations, the assisted user may not need to worry about divulging their privacy, and may not determine the operation with others repeatedly. The user only need to finish operations and click a next operation to complete the entire assisting process. Therefore, the assisting process may provide better guidance and learning effect to improve the user experience.

The embodiments of the present disclosure further provide a computer-readable non-transitory storage medium. The non-transitory storage medium may store a plurality of instructions, and the processor may be configured to load the instructions and perform the methods and operations as shown in the embodiments shown in FIG. 1 to FIG. 15. Detailed execution processes may be referred to the embodiments in FIG. 1 to FIG. 15, and will not be repeatedly described herein.

The present disclosure provides a computer program product, the computer program product may store more than one instructions, and the processor is configured to load the more than one instructions and perform the methods and operations in the embodiments shown in FIG. 1-FIG. 15. The specific execution process may be referred to the embodiments of FIG. 1-FIG. 15 and will not be repeatedly described herein.

Those of ordinary skill in the art may understand that all or part of the processes of the above method of embodiments may be implemented by instructing relevant hardware through a computer program. The programs may be stored in a computer-readable non-transitory storage medium. The processes of the above methods of embodiments may be included when the programs are executing. The non-transitory storage medium may be a magnetic disk, an optical disk, a read-only storage memory or a random access memory, and the like.

The embodiments disclosed above are exemplary only and shall not be interpreted as limiting the scope of the embodiments of the present disclosure. Therefore, equivalent changes according to the claims of the present disclosure shall be within the scope of the present disclosure.

What is claimed is:

1. A remote assistance method, comprising:
reading an assistance request sent by an assisted terminal in an assistance application, wherein the assistance request comprises an operation platform of the assisted terminal;
in response to starting up an assistance function of the assistance application, displaying a display interface comprising a terminal operation platform set;
receiving a selection instruction on a target operation platform of the terminal operation platform set, and displaying a function operation interface corresponding to the target operation platform; wherein the target operation platform of the terminal operation platform set and the operation platform of the assisted terminal are a same type of operation system;
obtaining operation information input on the function operation interface; and
generating at least one prompt board of the operation information, and sending the at least one prompt board to the assisted terminal corresponding to the target operation platform sequentially according to an operation sequence of the at least one prompt board; wherein the at least one prompt board is configured to instruct an assisted user of the assisted terminal to perform operations on a displayed function operation interface based on the at least one prompt board.

2. The method according to claim 1, wherein the operation information comprises at least one of an operation application, an operation page, an operation position, and an operation motion.

3. The method according to claim 1, wherein before the reading the assistance request sent by the assisted terminal in an assistance application, the method further comprises:
displaying at least one assistance request on the display interface in response to the assistance application being started up, wherein the at least one assistance request is sent by the assisted user.

4. The method according to claim 1, wherein the assistance request comprises a terminal identifier of the assisted terminal, and the sending the at least one prompt board to the assisted terminal corresponding to the target operation platform sequentially according to an operation sequence of the at least one prompt board, comprises:
sending the at least one prompt board to the assisted terminal corresponding to the terminal identifier according to the operation sequence of the at least one prompt board.

5. The method according to claim 1, wherein the assistance request is a request, which is sent by the assisted terminal to an assisting terminal specified by the assisted terminal, or a request, which is sent by the assisted terminal on a public platform and is to be responded by any terminal.

6. The method according to claim 1, wherein the terminal operation platform set comprises different terminal operation platforms; the different terminal operation platforms are operation systems created by different terminal manufacturers, and the different terminal operation platforms correspond to different function operation interfaces of a same function.

7. The method according to claim 1, wherein the displayed function operation interface displayed on the assisted terminal is not displayed on an assisting terminal in the remote assistance method.

8. A terminal, comprising:
a processor and a non-transitory memory, the non-transitory memory storing computer programs, which when executed by the processor, cause the processors to perform operations of:
reading an assistance request sent by an assisted terminal in an assistance application, wherein the assistance request comprises an operation platform of the assisted terminal;
in response to starting up an assistance function of the assistance application, displaying a display interface comprising a terminal operation platform set;
receiving a selection instruction on a target operation platform of the terminal operation platform set, and displaying a function operation interface corresponding to the target operation platform; wherein the target operation platform of the terminal operation platform set and the operation platform of the assisted terminal are a same type of operation system;
obtaining operation information input for the function operation interface; and
generating at least one prompt board of the operation information, and sending the at least one prompt board to the assisted terminal corresponding to the target operation platform sequentially according to an operation sequence of the at least one prompt board; wherein the at least one prompt board is configured to instruct an assisted user of the assisted terminal to perform operations on a displayed function operation interface based on the at least one prompt board.

9. The terminal according to claim 8, wherein the operation information comprises at least one of an operation application, an operation page, an operation position, and an operation motion.

10. The terminal according to claim 8, wherein before reading the assistance request sent by the assisted terminal in the assistance application, the processor is further configured to load the computer programs to perform operations of:
displaying at least one assistance request on the display interface in response to the assistance application being started up, wherein the at least one assistance request is sent by the assisted user.

11. The terminal according to claim 8, wherein the assistance request comprises a terminal identifier of the assisted terminal, and while sending the at least one prompt board to the assisted terminal corresponding to the target operation platform sequentially according to an operation sequence of the at least one prompt board, the processor is further configured to load the computer programs to perform operations of:

sending the at least one prompt board to the assisted terminal corresponding to the terminal identifier according to the operation sequence of the at least one prompt board.

12. A non-transitory computer-readable storage medium, storing a plurality of instructions, wherein the plurality of instructions are configured to be loaded by a processor to perform operations of:

reading an assistance request sent by an assisted terminal in an assistance application, wherein the assistance request comprises an operation platform of the assisted terminal;

in response to starting up an assistance function of the assistance application, displaying a display interface comprising a terminal operation platform set;

receiving a selection instruction on a target operation platform of the terminal operation platform set, and displaying a function operation interface corresponding to the target operation platform; wherein the target operation platform of the terminal operation platform set and the operation platform of the assisted terminal are a same type of operation system;

obtaining operation information input for the function operation interface; and generating at least one prompt board of the operation information, and sending the at least one prompt board to the assisted terminal corresponding to the target operation platform sequentially according to an operation sequence of the at least one prompt board; wherein the at least one prompt board is configured to instruct an assisted user of the assisted terminal to perform operations on a displayed function operation interface based on the at least one prompt board.

* * * * *